June 24, 1958  H. VOEGELIN  2,839,813
FABRIC SPREADING ROLLER
Filed April 19, 1955
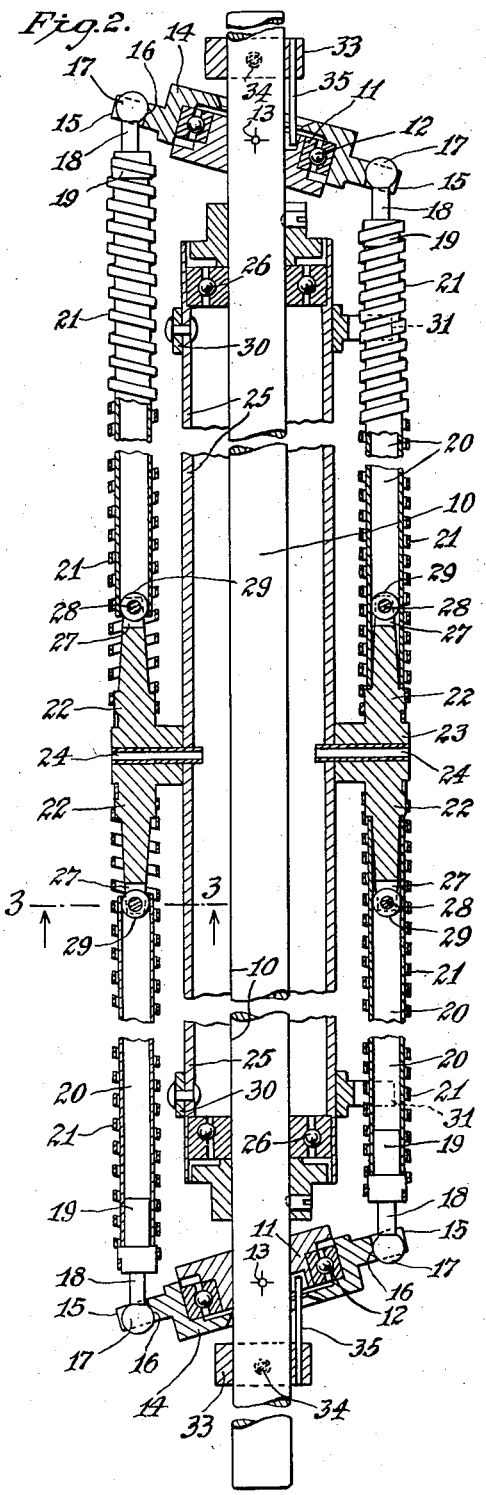
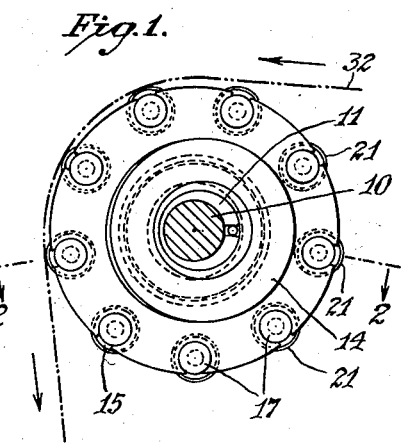
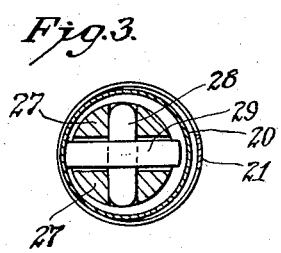
INVENTOR.
HEINRICH VOEGELIN
BY
*Kenyon & Kenyon*
ATTORNEYS.

United States Patent Office  2,839,813
Patented June 24, 1958

2,839,813
FABRIC SPREADING ROLLER

Heinrich Voegelin, Wyler, near Utzenstorf, Switzerland, assignor to Fritz Buser Maschinen- und Apparatebau, Wyler, near Utzenstorf, Switzerland Application April 19, 1955, Serial No. 502,468

6 Claims. (Cl. 26—64)

The object of the present invention is a temple roller for band-like webs by means of which the webs can be stretched laterally during a direction changing passage over the roller and any creases extending in the longitudinal direction of the webs can be eliminated during such direction changing passage thereover.

According to the invention several coil-like stretching elements are arranged parallel to and in uniform distribution around a stationary axle and mounted for joint rotation therearound, each of said stretching elements being adapted to be lengthened and shortened in the axial direction and at one end engaging a carrier arranged for rotation around said axle in a predetermined rotary path, said carrier impressing an axial reciprocating motion on the respective end of said stretching element during its rotary movement around said axle and thus causing an alternating lengthening and shortening of the length of the stretching element.

By way of example one embodiment of the temple roller according to the invention is shown in the accompanying drawing, in which:

Fig. 1 is a side view in the axial direction,

Fig. 2 an axial section taken on line 2—2 of Fig. 1 with portions of the elements shown in plan view, and Fig. 3 a cross-section taken on line 3—3 of Fig. 2 on an enlarged scale and showing a detail.

On a stationary axle 10 there is provided at either end of the temple roller a hub disc 11 with a ball bearing 12 secured thereon, the said disc and bearing being disposed at a bias to the axial direction. Relative to a plane at right angles to the axle 10, the rotational planes of the two ball bearings 12 are symmetrical to each other, and their centers of rotation 13 lie in the axis of the axle 10. On the outer race of the ball bearing 12 there is mounted a carrier disc 14 having on a circle around its center of rotation nine equally spaced like slots 15 which open outwardly towards the periphery of the disc, said slots being provided with spherically cup-shaped enlarged recesses 16 which are arranged in the outward faces of discs 14 of the temple roller. In each of said recesses 16 a spherical head 17 is mounted, the center thereof being disposed in the rotational plane of the carrier disc 14 and having a plug 19 secured to a neck 18 insertable through the slot 15. A tube 20 and a coil spring 21 surrounding said tube loosely and preferably consisting of strip steel are each secured to the plug 19. At their other ends the coil springs 21 are each secured to an axial arm 22 of a support ring 23, said support ring being mounted midways between the two carrier discs 14 by means of the screws 24 extending into a hollow shaft 25 coaxially surrounding the axle 10, said hollow shaft 25 being rotatably mounted on the axle 10 by means of two ball bearings 26.

The free end of each of the arms 22 of the support ring 23 which extends into the appertaining tube 20 is divided to provide two fork legs 27 (Fig. 3) between which a roller 29 is mounted on a pin 28 which latter is secured in said legs, said roller 29 being disposed in an axial plane passing through the axes of the axle 10 and of the corresponding tube 20 and being arranged for slight axial reciprocatory movement. Adjacent each of the ball bearings 26 a driver ring 30 is riveted on to the hollow shaft 25, said driver ring 30 having two or three radially outwardly extending U-shaped forks 31 for semicircularly embracing a coil spring 21 each on the side of said springs lying nearest the hollow shaft 25.

On rotation of the coil springs 21 serving as stretching elements together with the other parts of the described temple roller around the axle 10, the spherical heads 17 engaged in the one carrier disc 14 and those in the other disc 14, together with the tubes 20 supporting the springs 21 at the same time carry out an axial reciprocating motion during such rotary movement around axle 10 due to the biased arrangement of the rotational plane of the discs 14 relative to the axle 10. As a result, each coil spring undergoes an alternating elastic alteration of length in the sense of an elongation and contraction respectively, whilst its associated tube 20 is correspondingly reciprocated on an arm supported roller 29.

With band-like webs, in particular webs of fabric, the spring elongation is used to make any creases in the web—which may run on to the roller and which generally extend in the longitudinal direction of the web—disappear during the direction changing passage of the fabric web 32 over the temple roller in the direction of the arrow in Fig. 1 by continuously stretching the fabric web from its center line outwardly towards its two longitudinal edges. During this operation the fabric web passes on to the stretching elements which are just starting to elongate and the web is carried along by the stretching elements by frictional contact therewith. The web 32, however, separates from said stretching elements before they start to contract. The lateral motion of the coil turns during elongation of the one spring towards one longitudinal edge of the fabric web and of another spring towards the other longitudinal edge of the web effects the stretching of said web in width by frictional contact. The amount of the crease eliminating motion effected by the springs which extend from the arms 22 of the support ring 23 towards the plugs 19 of the spherical heads 17 is relatively greater with increasing radial distance of the spherical heads 17 from the center of rotation 13 or also with greater bias of the rotational planes of the carrier discs 14 relative to the axle 10. Therefore the hub discs 11 together with the ball bearings 12 and the carrier discs 14 are preferably mounted exchangeably on the axle 10. To enable accurate setting of the rotational planes of the two carrier discs 14 relative to each other each of the hub discs 11 can also be adjusted individually on the axle 10 and then be locked in correct position. For such purposes conventional means may be provided which for instance are constituted by a ring 33 fixed on the axle 10, by a screw 34 and, also by including a locking pin 35 for engaging the hub disc 11.

The temple roller described may also be used for preventing the fabric web from laterally running off the prescribed direction of travel, i. e. for maintaining the center-true travel of the fabric web.

What I claim is:

1. A temple roller for band-like webs, comprising an axle, several coil-like stretching elements arranged parallel to and in uniform distribution around said axle and mounted for joint rotation therearound, each of said stretching elements being adapted to be lengthened and shortened in the axial direction, a carrier arranged for rotation around said axle in a predetermined rotary path and engaged by one of the ends of respective of said elements, said engaging ends being mounted on said carrier for rotation in a plane at a bias to the axis of said axle and intersecting said axis at the center of rotation, and a support ring rotatably mounted on said axle and having arms extending therefrom, said arms having secured thereon the opposite ends of said stretching elements, and each stretching element consisting of a coil spring and, a supporting tube passing through the coil spring, one end of said tube being fixed to said carrier and the other end being longitudinally displaceably mounted on an arm of said support ring.

2. A temple roller for band-like webs, comprising a stationary axle, several coil spring members arranged parallel to and in uniform distribution around said axle and mounted for joint rotation therearound, each of said coil spring members being adapted to be elastically lengthened and shortened in the axial direction, a carrier disc mounted for rotation around said axle in a plane which is at a bias to the axis of said axle and intersecting said axis at the center of rotation, one of the ends of said coil spring members comprising each a spherical head for engaging said carrier disc in a spherically cup-shaped bearing surface forming a recess, said recesses being provided along the disc periphery, a support ring rotatably mounted on said axle and having several axially projecting arms on each of which is secured the other end of one of said coil spring members, a supporting tube passing through each of said coil spring members, one end of said tube being fixed to said carrier disc and the other end being longitudinally displaceably mounted on one of said projecting arms of said support ring, and a roller rotatably arranged at the projecting end of each of said arms in the axial plane passing through the axes of said axle and of said supporting tube for displaceably maintaining said tube.

3. A temple roller as claimed in claim 2, including a hollow shaft rotatably mounted on said stationary axle and to which said support ring is secured, and drivers fixed to said hollow shaft and which engage individual coil spring members, said drivers including fork means for effecting engagement with said coil spring members.

4. A temple roller as claimed in claim 2, wherein the carrier disc is provided with slots open towards the periphery of said disc and of lesser width than the spherical heads, said slots having a recess each for a spherical head, and each spherical head being provided with a neck portion capable of being slid into the slot.

5. A temple roller as claimed in claim 2 including a hub and wherein the carrier disc is mounted on said hub, said hub being rotatably adjustable and lockable in adjusted position on said axle.

6. A temple roller for band-like webs, comprising an axle, several coil-like stretching elements arranged parallel to and in uniform distribution around said axle and mounted for joint rotation therearound, each of said stretching elements being adapted to be lengthened and shortened in the axial direction, a carrier arranged for rotation around said axle in a predetermined rotary path and engaged by one of the ends of respective of said elements, said engaging ends being mounted on said carrier for rotation in a plane at a bias to the axis of said axle and intersecting said axis at the center of rotation, and a support ring rotatably mounted on said axle and having arms extending therefrom, said arms having secured thereon the opposite ends of said stretching elements, and the carrier including a carrier disc having spherically cup-shaped bearing surfaces, and spherical heads secured to said first named ends of said stretching elements, said heads being supported in said bearing surfaces for swiveling action during rotation of the carrier in its said predetermined rotary path.

References Cited in the file of this patent

UNITED STATES PATENTS

| | | |
|---|---|---|
| 479,501 | Goddard | July 26, 1892 |
| 1,088,599 | Livesey | Feb. 24, 1914 |